United States Patent [19]
Sigler

[11] Patent Number: 5,089,910

[45] Date of Patent: Feb. 18, 1992

[54] INFRARED CATADIOPTRIC ZOOM RELAY TELESCOPE WITH AN ASPERIC PRIMARY MIRROR

[75] Inventor: Robert D. Sigler, Cupertino, Calif.

[73] Assignee: Lookheed Missiles & Space Company, Inc., Sunnyvale, Calif.

[21] Appl. No.: 546,968

[22] Filed: Jul. 2, 1990

Related U.S. Application Data

[63] Continuation-in-part of Ser. No. 545,211, Jun. 28, 1990.

[51] Int. Cl.$^5$ .......................... G02B 23/00; G02B 5/24; G02B 17/00
[52] U.S. Cl. ................................ 359/399; 359/357; 359/366; 359/728
[58] Field of Search ........ 350/500, 537, 557, 561–564, 350/572, 442, 443, 503–505, 442–443, 1.2–1.4, 442–446

[56] References Cited

U.S. PATENT DOCUMENTS

| | | | |
|---|---|---|---|
| 3,963,328 | 6/1976 | Abel | 350/443 |
| 4,235,508 | 11/1980 | Kaprelian | 350/505 |
| 4,240,702 | 12/1980 | Casas | 350/443 |
| 4,342,503 | 8/1982 | Shafer | 350/443 |
| 4,523,816 | 6/1985 | Kreitzer | 350/442 |
| 4,714,307 | 12/1987 | Palmer | 350/443 |
| 4,863,249 | 9/1989 | Muchel | 350/443 |

Primary Examiner—Bruce Y. Arnold
Assistant Examiner—Thong Nguyen
Attorney, Agent, or Firm—John J. Morrissey

[57] ABSTRACT

A catadioptric zoom relay telescope with an aspherical primary mirror and only three movable lens elements focuses all wavelengths in a broad infrared bandwidth onto a common focal plane with substantially diffraction-limited imagery throughout a changing focal ratio (i.e., a zoom range) from less than f/1.5 to more than f/6.0.

7 Claims, 6 Drawing Sheets

FIG_1

FIG_4

FIG_2

FIG_3 o = 8.0 microns    ▲ = 10.0 microns    □ = 12.0 microns

RMS = .0390

RMS = .0215

RMS = .0215

ON AXIS

RMS = .0199

FIG_5

FIG_6

○ = 8.0 microns  ▲ = 10.0 microns  □ = 12.0 microns

RMS = .0431

RMS = .0343

RMS = .0343

ON AXIS

RMS = .0290

FIG_7

FIG_10

FIG_8

FIG_9

FIG_11

FIG_12

○ = 8.0 microns   ▲ = 10.0 microns   □ = 12.0 microns

RMS = .0708   RMS = .0613

RMS = .0613   ON AXIS   RMS = .0515

INFRARED CATADIOPTRIC ZOOM RELAY TELESCOPE WITH AN ASPERIC PRIMARY MIRROR

This application is a continuation-in-part of patent application Ser. No. 545,211 filed on June 28, 1990.

TECHNICAL FIELD

This invention relates generally to catadioptric zoom relay telescopes for use in infrared applications, and more particularly to such a telescope with an aspheric primary mirror.

BACKGROUND OF THE INVENTION

A catadioptric zoom relay telescope with a fixed entrance pupil diameter, whose refractive elements are all made from the same type of infrared-transmissive material, and which is capable of achieving a continuously variable focal length over an infrared wavelength band from B to 12 microns while maintaining substantially diffraction-limited imagery on a stationary focal plane throughout a changing focal ratio from less than f/1.5 to more than f/6.0, was disclosed in co-pending U.S. patent application Ser. No. 545,211 filed on June 28, 1990, which is incorporated herein by reference.

The design form for the catadioptric zoom relay telescope disclosed in the aforementioned patent application Ser. No. 545,211 specifies that the primary mirror and all the other optical components of the telescope have spherical surfaces. Asphericity is sometimes introduced into an optical system as a design expedient to improve performance with respect to monochromatic aberrations (particularly spherical aberration), and/or to obtain a reduction in the number of optical components needed to achieve optical performance equivalent to that of a system having all spherical surfaces.

SUMMARY OF THE INVENTION

It is a general object of the present invention to provide a simplified design form for a catadioptric zoom relay telescope of the type disclosed in the aforementioned patent application Ser. No. 545,211 in terms of the number of movable lens elements, while maintaining an equivalent performance.

It is a particular object of the present invention to provide a design form for a catadioptric zoom relay telescope having mechanical features and performance characteristics that are generally equivalent to those of the telescope disclosed in the aforementioned patent application Ser. No. 545,211 but which uses only three movable lens elements, and which introduces asphericity only into the surface of the primary mirror of the telescope.

In accordance with the present invention, a design form is provided for a catadioptric zoom relay telescope with a fixed entrance pupil diameter that is capable of achieving a continuously variable focal length over an infrared wavelength band from 8 to 12 microns while maintaining substantially diffraction-limited imagery on a stationary focal plane throughout a changing focal ratio from less than f/1.5 to more than f/6.0, and which uses only three movable lens elements.

BEST MODE OF CARRYING OUT THE INVENTION

Figure 1:
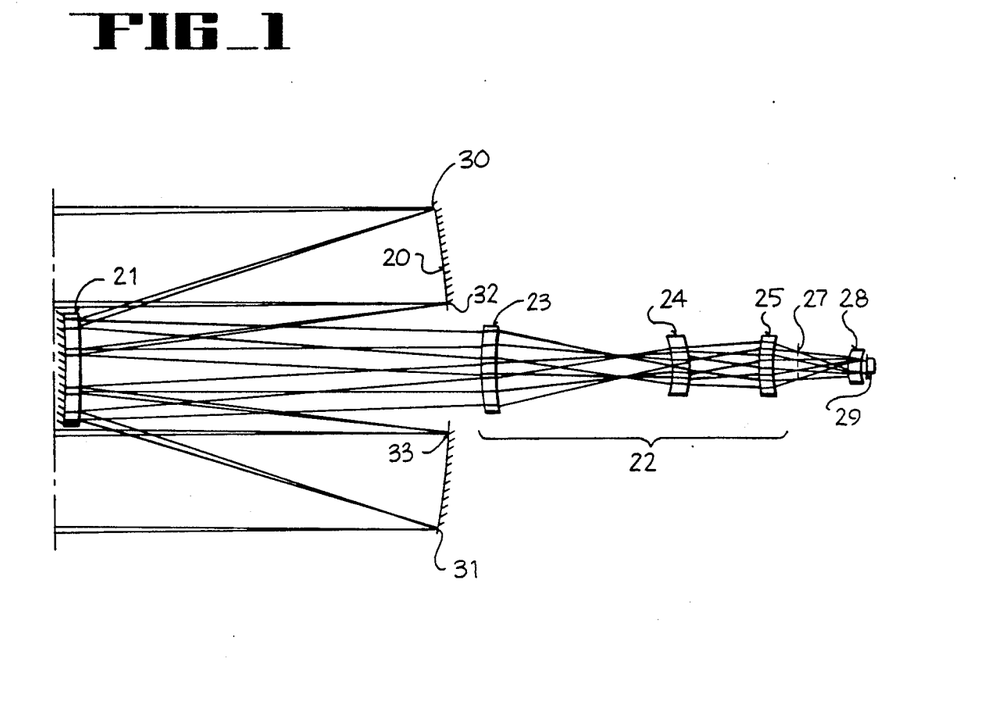
FIG. 1 is a profile illustration of a catadioptric zoom relay telescope according to the present invention with a fixed aperture of 500 mm, and with movable lens elements positioned to provide a focal ratio of f/1.5, a focal length of about 750 mm, and a field of view of 1.000 degree.

As shown in FIG. 1, a catadioptric zoom relay telescope according to the present invention comprises a primary mirror 20 for gathering rays of optical radiation from distant objects, and a secondary Mangin mirror 21 for relaying the gathered rays through an aperture in the primary mirror 20 to an imaging system 22. The primary and secondary mirrors 20 and 21 are fixedly positioned with respect to each other along an optic axis, and the imaging system 22 is positioned along the same optic axis. The perimeter of the primary mirror 20 defines an entrance pupil for the telescope; and the imaging system 22 forms an image of the primary mirror 21 on an intermediate Lyot stop 27 that coincides with an exit pupil for the telescope. Rays passing through the Lyot stop 27 are focussed by a field lens element 28 onto an image plane where a detector 29 is located.

It is a feature of the telescope illustrated in FIG. 1 that the primary mirror 20 has an aspheric profile.

The secondary Mangin mirror 21 comprises a lens component whose back surface (i.e., the surface facing away from the primary mirror 20) is silvered to form a convex mirror. The lens system 22 comprises three lens elements 23, 24 and 25, which are movable with respect to the mirrors 20 and 21 and with respect to each other along the optic axis. The field lens element 28 is stationary with respect to the mirrors 20 and 21. The aperture in the primary mirror 20, as well as the perimeters of the four lens elements 23, 24, 25 and 28, are circularly symmetrical about the optic axis; and the positions assumed by the three movable lens elements 23, 24 and 25 along the optic axis are determined by the particular focal ratio selected for the imaging system 22.

The lens component of the Mangin mirror 21 and the point 32 with respect to the optic axis. The rays reflected from the points 30, 31, 32 and 33 undergo refraction upon entering the lens component of the Mangin mirror 21, and again undergo refraction upon returning through the lens component of the Mangin mirror 21 after reflection from the silvered back surface thereof. The silvered back surface of the Mangin mirror 21 actually serves as the secondary mirror of the telescope.

Rays of infrared radiation reflected by the Mangin mirror 21 pass through the aperture in the primary mirror 20 into the lens system 22. The lens elements 23, 24 and 25 of the imaging system 22 coact with each other to relay an image of the primary mirror 20 (substantially without chromatic aberration) onto the Lyot stop 27. The position of the Lyot stop 27 changes as with respect to the mirrors 20 and 21 as the positions of the movable lens elements 23, 24 and 25 change to cause the telescope to zoom through a range of changes in focal ratio (i.e., from a focal ratio as low as f/1.5 or lower to a focal ratio as high as f/6.0 or higher). A particular embodiment of the present invention, which has been designed to have an entrance aperture (i.e., a diameter of the primary mirror 20) of 500 mm, an effective focal length of about 750 mm (more precisely, 753 mm), and a field of view of 1.000 degree, and for which the refractive elements of the telescope (viz., the lens component of the Mangin mirror 21 and the four lens elements 23, 24, 25 and 28) are made of germanium and are optimized for operation at a focal ratio of f/1.5 in the spectral bandwidth from 8 to 12 microns, is specified by an optical prescription as follows:

TABLE I

| Ref. No. in FIG. 1 | Surface No. | Element Diameter (mm) | Radius of Curvature (mm) | Distance to Next Surface (mm) | Medium Traversed to Next Surface |
|---|---|---|---|---|---|
| 20 | 1 | 500 | −1586.750 (k = −0.564052) | −563.358 | Reflector |
| 21 | 2 | 170 | −1282.451 | −20.000 | Germanium |
|  | 3 |  | −949.909 | 20.000 | Reflector |
|  | 4 |  | −1282.451 | 612.428 | Air |
| 23 | 5 | 130 | 534.803 | 20.000 | Germanium |
|  | 6 |  | 1151.673 | 271.869 | Air |
| 24 | 7 | 90 | −148.547 | 24.000 | Germanium |
|  | 8 |  | −149.590 | 107.467 | Air |
| 25 | 9 | 90 | 176.909 | 24.000 | Germanium |
|  | 10 |  | 454.648 | 36.433 | Air |
| 27 | 11 |  | ∞ | 73.798 | Air |
| 28 | 12 | 50 | 65.371 | 20.000 | Germanium |
|  | 13 |  | 101.019 | 10.000 | Air |
| 29 | 14 |  | ∞ |  | Detector | four lens elements 23, 24, 25 and 28 are all made from the same type of optical material, which is selected primarily on the basis of cost and availability. Typical infrared-transmissive optical materials that could be used for the lens component of the Mangin mirror 21 and for the four lens elements 23, 24, 25 and 28 include germanium, silicon, zinc sulfide, and zinc selenide.

Referring to FIG. 1 two non-parallel rays of infrared radiation from distant objects (e.g., stellar objects located at astronomical distances from the telescope) are shown incident upon a point 30 on the perimeter of the primary mirror 20. Two other non-parallel rays are shown incident upon another point 31 on the perimeter of the primary mirror 20 diametrically opposite the point 30. Also shown in FIG. 1 are two non-parallel rays incident upon a point 32 adjacent the aperture in the primary mirror 20, and two other non-parallel rays incident upon a point 33 likewise adjacent the aperture in the primary mirror 20 but symmetrically opposite the where the optically significant surfaces of the optical prescription are numbered consecutively along the path of optical radiation passing through the telescope; and where all surfaces are substantially spherical, except for Surface No. 1 (i.e., the surface of the primary mirror 20), which is aspheric with a conic constant $k = -0.564052$, and except for Surface No. 11 (i.e., the Lyot stop 27) and Surface No. 14 (i.e., the image plane where the detector 29 is located), which are planar.

The shape of an aspherical optical surface is completely specified in terms of a local three dimensional orthogonal (x,y,z) coordinate system by the equation:

$$Z = \frac{C\rho^2}{1 + [1 - (k + 1)C^2\rho^2]^{1/2}}$$

where the vertex of the surface (i.e., the intersection of the surface with the optic axis) is located at the coordinates (0,0,0), and the z axis (i.e., the axis of revolution of the surface) coincides with the optic axis;
where $P^2 = x^2 + y^2$;
where C is the curvature of the surface at the vertex, as given by $C = 1/R$,
where R is the radius of curvature of the surface at the vertex; and
where k is a conic constant that determines the classification of the surface according to a schema tabulated as follows:

TABLE II

| Range of Value of k | Shape of Surface |
| --- | --- |
| k < −1 | Hyperboloid |
| k = −1 | Paraboloid |
| −1 < k < 0 | Ellipsoid of revolution about the major axis |
| k = 0 | Sphere |
| k > 0 | Ellipsoid of revolution about the minor axis |

Since the conic constant for the surface of the primary mirror 20 has a value of $k = -0.564052$, the surface of the primary mirror 20 (i.e., Surface No. 1 in Table 1) is ellipsoidal.

The surface of the primary mirror 20 functions as the entrance aperture of the telescope. Rays reflected from Surface No. 1 pass from right to left toward the refractive front surface of the lens component of the Mangin mirror 21, which is listed in Table I as Surface No. 2. Rays entering the lens component of the Mangin mirror 21 pass toward the silvered (i.e., reflective) back surface thereof, which is listed in Table I as Surface No. 3. Rays reflected from Surface No. 3 pass from left to right through the lens component of the Mangin mirror 21, and are refracted for a second time at Surface No. 2 (which is accordingly listed for a second time in Table I, but with the designation Surface No. 4, where Surface No. 4 and Surface No. 2 are identical). The Mangin mirror 21 causes the rays to converge through the aperture in the primary mirror 20 toward the lens system 22.

The surfaces of the three movable lens elements 23, 24 and 25 and of the stationary field lens element 28 (designated from left to right along the optic axis as shown in FIG. 1) are listed consecutively in Table 1. Thus, Surface No. 5 and Surface No. 6 are the surfaces of the lens element 23; Surface No. 7 and Surface No. 8 are the surfaces of the lens element 24; and Surface No. 9 and Surface No. 10 are the surfaces of the lens element 25. The image of the primary mirror 20 is formed at the exit pupil (i.e., the Lyot stop) 27, which is listed as Surface No. 11. The surfaces of the stationary field lens element 28 are listed as Surface No. 12 and Surface No. 13. Rays passed by the Lyot stop 27 are focussed by the field lens element 28 onto the image plane where the detector 29 is located, which is listed in Table I as Surface No. 14.

The radii of curvature and the axial separations between adjacent surfaces are expressed in millimeters in Table 1. In accordance with optical design convention, the radius of curvature of a surface is positive if the center of curvature of the surface lies to the right of the surface, and negative if the center of curvature of the surface lies to the left of the surface. Similarly, an axial separation between two surfaces is positive if measured from left to right, and negative if measured from right to left.

Figure 2:
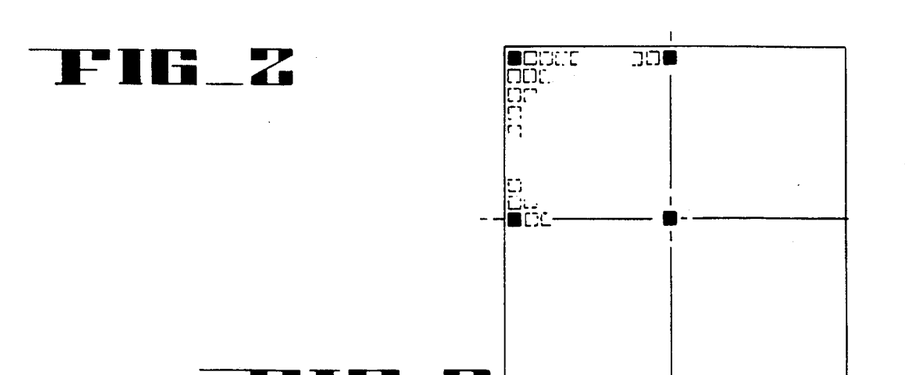
FIG. 2 is a schematic representation of the image plane of the catadioptric zoom relay telescope of the present invention on which an array of pixels indicating an array of corresponding photodetecting elements is illustrated.

In FIG. 2, the image plane of the telescope of FIG. 1 at which the detector 29 is located is represented by a square consisting of four symmetrical quadrants. The detector 29 comprises a planar array of photodetecting elements arranged so as to form a corresponding array of regularly spaced pixels on the image plane. Four particular pixels (viz., the pixels at the corners of one of the quadrants of the square representing the image plane) are darkened in FIG. 2. Performance of the telescope whose lens elements are positioned as illustrated in FIG. 1 (as a function of wavelength and field of view for the particular values of focal ratio, focal length and field of view specified by the optical prescription given in Table 1) is indicated in FIG. 3 by a set of four spot diagrams, which show ray intercepts for three distinct wavelengths at the four corresponding pixels on the image plane as indicated by the darkened pixels in FIG. 2.

Figure 3:
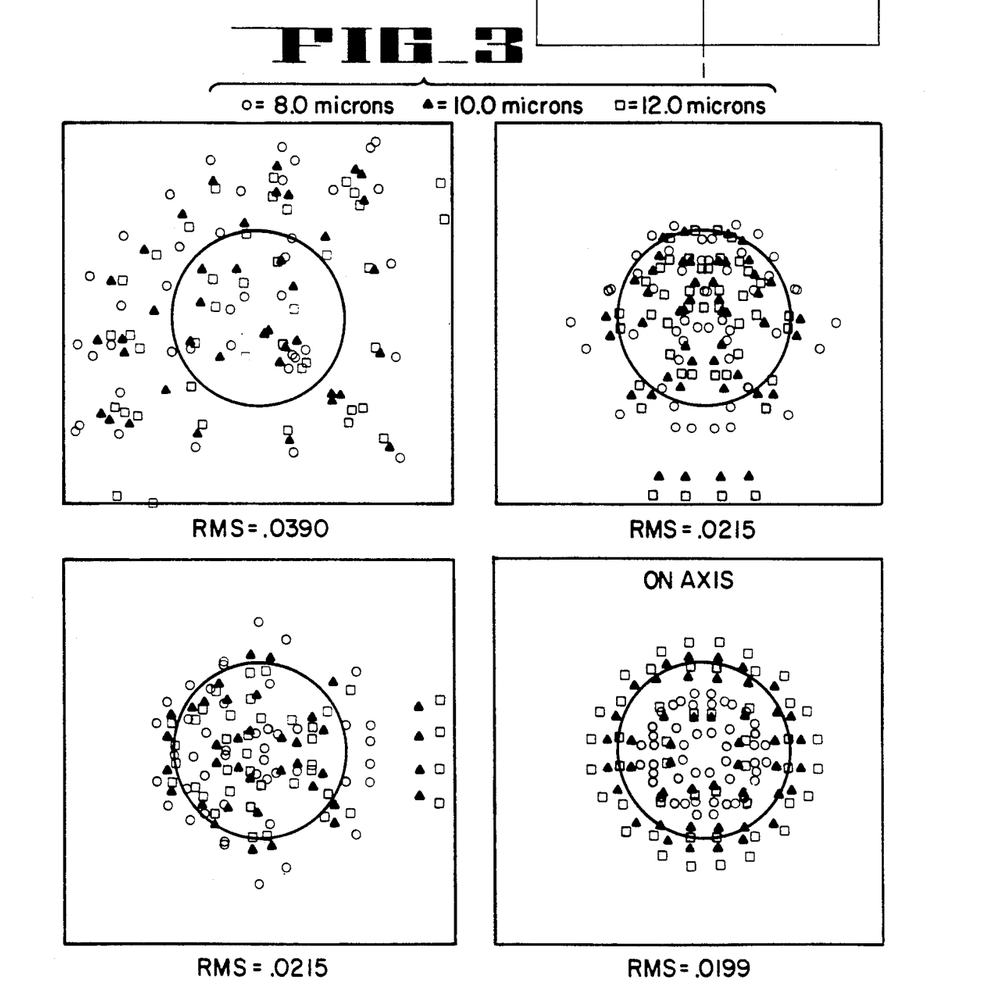
FIG. 3 is a set of spot diagrams showing ray intercepts for three distinct wavelengths on four different pixels, as indicated by the darkened pixels in FIG. 2, on the image plane of the catadioptric zoom relay telescope of the present invention with lens elements positioned as illustrated in FIG. 1.

The three wavelengths for which ray intercepts are shown in FIG. 3 are 8.0 microns (whose ray intercepts are represented by circles), 10.0 microns (whose ray intercepts are represented by triangles), and 12.0 microns (whose ray intercepts are represented by squares). The four-quadrant square of FIG. 2 representing the image plane is dimensioned to fill a field of view of 1.0 degree, and each pixel is a square of 100 microns on an edge. The lower right-hand pixel shown in FIG. 3 is the center pixel on the image plane as shown in FIG. 2, and all ray intercepts shown thereon have an RMS spot radius of about 0.0199 micron. The upper right-hand pixel shown in FIG. 3 is the uppermost pixel on the vertical axis separating the two upper quadrants on the image plane as shown in FIG. 2; and all ray intercepts shown thereon have an RMS spot radius of about 0.0215 micron. The upper left-hand pixel shown in FIG. 3 is the pixel that is shown in FIG. 2 in the upper left-hand corner of the image plane; and all ray intercepts shown thereon have an RMS spot radius of about 0.0390 micron. The lower left-hand pixel shown in FIG. 3 is the left-most pixel on the horizontal axis separating the upper left quadrant from the lower left quadrant on the image plane as shown in FIG. 2; and all ray intercepts shown thereon have an RMS spot radius of about 0.0215 micron.

The distribution of ray intercepts in the other pixels in the upper left-hand quadrant on the image plane, as indicated in FIG. 2, can be appreciated by extrapolation from the distributions shown in the four pixels illustrated in FIG. 3. Also, the distribution of ray intercepts in the pixels in the other three quadrants of the image plane can be appreciated by noting that the distributions are symmetrical with respect to the vertical and horizontal axes defining the quadrants. In FIG. 3, an Airy disk for the 12.0 micron wavelength is shown concentrically positioned on each pixel. It is noteworthy with respect to FIG. 3 that ray intercepts in the wavelength range from 8.0 microns to 12.0 microns cluster within or in the vicinity of the Airy disk of 12-micron diameter over the major part of the image plane, which indicates a performance that is substantially diffraction-limited.

The positions of the lens elements 23, 24 and 25 are variable along the optic axis by means of a conventional cam mechanism in order to change the focal ratio of the imaging system 22. Using $D_1$ to represent the axial separation between the Mangin mirror 21 and the lens element 23 (i.e., between Surface No. 4 and Surface No. 5), $D_2$ to represent the axial separation between the lens elements 23 and 24 (i.e., between Surface No. 6 and Surface No. 7), $D_3$ to represent the axial separation between the lens elements 24 and 25 (i.e., between Surface No. B and Surface No. 9), $D_4$ to represent the axial separation between the lens element 25 and the Lyot stop 27 (i.e., between Surface No. 10 and Surface No. 11), and $D_5$ to represent the axial separation between the Lyot stop 27 and the field lens element 28 (i.e., between Surface No. 11 and Surface No. 12), the positions of the lens elements 23, 24 and 25 as shown in FIG. 1 are specified as follows:

TABLE III

| Lens Position | Separation (mm) |
|---|---|
| $D_1$ | 612.428 |
| $D_2$ | 271.869 |
| $D_3$ | 107.467 |
| $D_4$ | 36.433 |
| $D_5$ | 73.798 | where the above-listed values for the separations between adjacent surfaces are repeated from the fifth column in Table 1.

To zoom from the imagery achievable with a focal ratio of f/1.5, a focal length of 753 mm, and a field of view of 1.000 degree in the wavelength range from 8 to 12 microns (as provided by the positions specified in Table III for the movable lens elements 23, 24 and 25) to an imagery that can be achieved with a focal ratio of about f/3.0 (more precisely, f/2.9), a focal length of about 1500 mm (more precisely, 1468.288 mm), and a field of view of about 0.500 degree (more precisely, 0.48 degree), the positions of the lens elements 23, 24 and 25 are changed so that the separations between adjacent surfaces are as follows:

TABLE IV

| Lens Position | Separation (mm) |
|---|---|
| $D_1$ | 550.150 |
| $D_2$ | 220.822 |
| $D_3$ | 146.433 |
| $D_4$ | 36.682 |
| $D_5$ | 165.910 |

Figure 4:
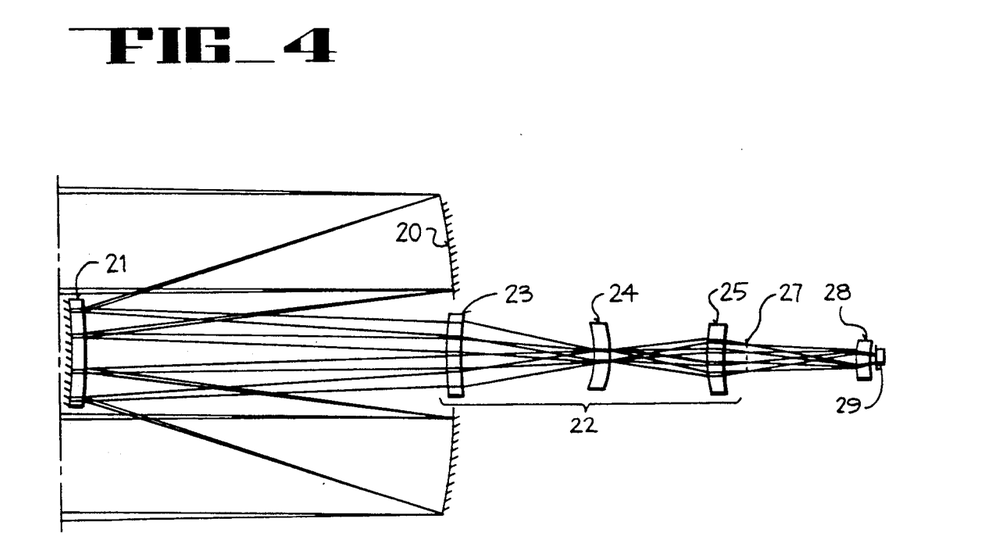
FIG. 4 is a profile illustration of the catadioptric zoom relay telescope of FIG. 1 after the movable lens elements have changed positions (i.e., zoomed) to provide a focal ratio of about f/3.0, a focal length of about 1500 mm, and a field of view of about 0.500 degree.

The same telescope as shown in FIG. 1, but with the positions of the movable lens elements 23, 24 and 25 changed in accordance with the values listed in Table IV for the separations between adjacent surfaces, is illustrated in FIG. 4. The position of the Lyot stop 27 also changes as the movable lens elements 23, 24 and 25 change position. However, it is a feature of the present invention that the position of the image plane (where the detector 29 is located) remains unchanged as movable lens elements 23, 24 and 25 change position.

Figures 5, 6:
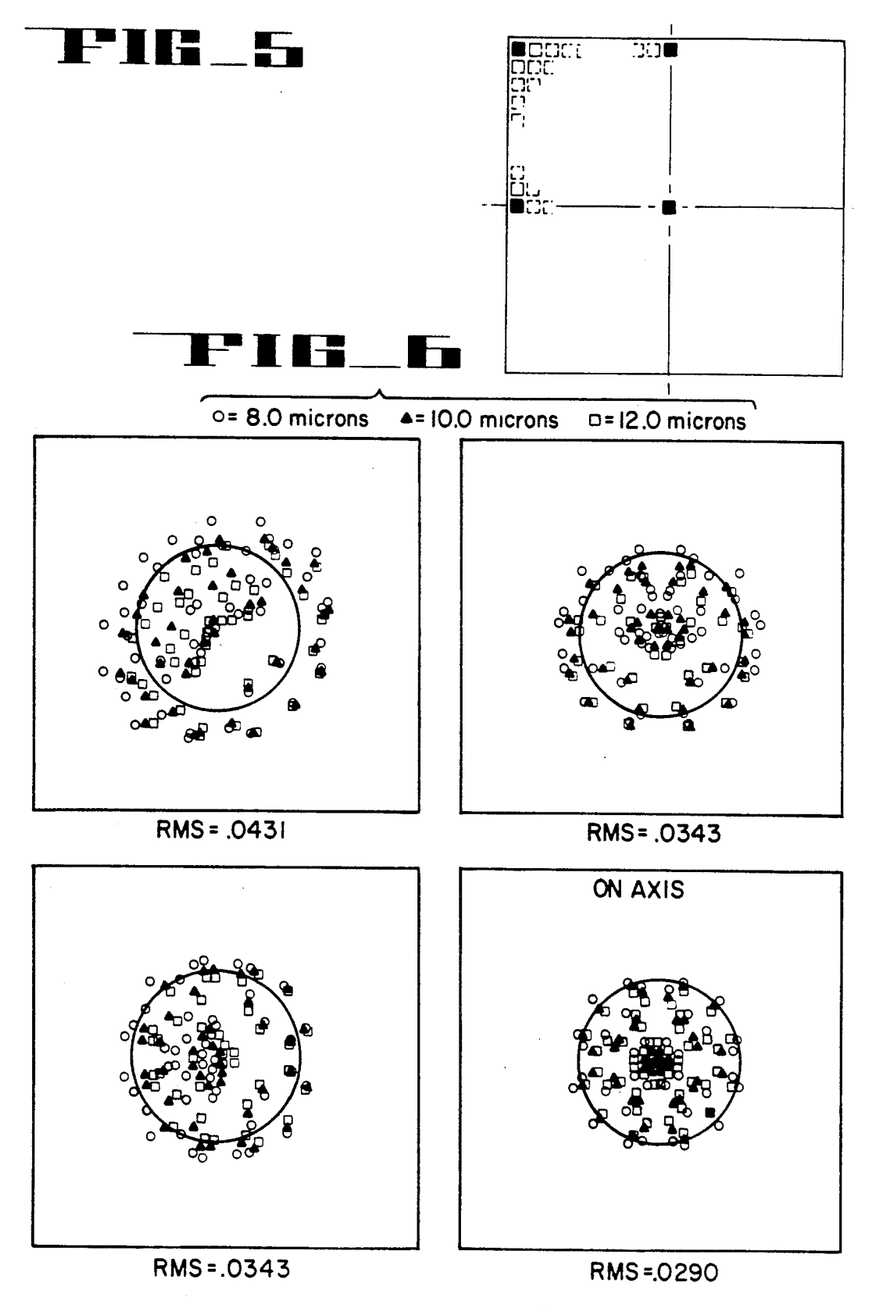
FIG. 5 is a reprise of FIG. 2 schematically representating the image plane of the catadioptric zoom relay telescope of the present invention on which an array of pixels indicating an array of corresponding photodetecting elements is illustrated.
FIG. 6 is a set of spot diagrams showing ray intercepts for three distinct wavelengths on four different pixels, as indicated by the darkened pixels in FIG. 5, on the image plane of the catadioptric zoom relay telescope of the present invention with lens elements positioned as illustrated in FIG. 4.

In FIG. 5, the image plane of the telescope is again represented by a square consisting of four symmetrical quadrants. FIG. 5 is a reprise of FIG. 2, because the image plane does not change as the telescope zooms to achieve imagery at different focal ratios. In FIG. 6, performance of the telescope with the movable lens elements 23, 24 and 25 in the positions indicated in FIG. 4, and with separations between adjacent surfaces as specified in Table IV, is illustrated as a function of wavelength and field of view by means of a corresponding set of spot diagrams in which ray intercepts at the image plane are shown.

The three wavelengths for which ray intercepts are shown in FIG. 6 are likewise 8.0 microns (whose ray intercepts are represented by circles), 10.0 microns (whose ray intercepts are represented by triangles), and 12.0 microns (whose ray intercepts are represented by squares). The four-quadrant square of FIG. 5 representing the image plane is dimensioned to fill a field of view of 0.48 degree, and each pixel is a square of 200 microns on an edge. The lower right-hand pixel shown in FIG. 6 is the center pixel on the image plane as shown in FIG. 5; and all ray intercepts shown thereon have an RMS spot radius of about 0.0290 micron. The upper right-hand pixel shown in FIG. 6 is the uppermost pixel on the vertical axis separating the two upper quadrants on the image plane as shown in FIG. 5; and all ray intercepts shown thereon have an RMS spot radius of about 0.0343 micron. The upper left-hand pixel shown in FIG. 6 is the pixel that is shown in FIG. 45 in the upper left-hand corner of the image plane; and all ray intercepts shown thereon have an RMS spot radius of about 0.0431 micron. The lower left-hand pixel shown in FIG. 6 is the left-most pixel on the horizontal axis separating the upper left quadrant from the lower left quadrant on the image plane as shown in FIG. 5; and all ray intercepts shown thereon have an RMS spot radius of about 0.0343 micron.

The distribution of ray intercepts in the other pixels in the upper left-hand quadrant on the image plane, as indicated in FIG. 5, can be appreciated by extrapolation from the distributions shown in the four pixels illustrated in FIG. 6. Also, the distribution of ray intercepts in the pixels in the other three quadrants of the image plane can be appreciated by noting that the distributions are symmetrical with respect to the vertical and horizontal axes defining the quadrants. In FIG. 6, an Airy disk for the 12.0 micron wavelength is shown concentrically positioned on each pixel. It is noteworthy with respect to FIG. 6 that ray intercepts in the wavelength range from 8.0 microns to 12.0 microns are clustered tightly within or in the very close vicinity of the Airy disk of 12-micron diameter over most of the image plane, which indicates substantially diffraction-limited performance.

To zoom further to an imagery that can be achieved with a focal ratio of about f/4.5 (more precisely, f/4.4), a focal length of about 2250 mm (more precisely, 2183.621 mm), and a field of view of about 0.375 degree (more precisely, 0.33 degree), the positions of the movable lens elements 23, 24 and 25 are changed so that the separations between adjacent surfaces are as follows:

TABLE V

| Lens Position | Separation (mm) |
|---|---|
| $D_1$ | 480.848 |
| $D_2$ | 213.827 |
| $D_3$ | 122.458 |
| $D_4$ | 44.157 |
| $D_5$ | 240.711 |

Figure 7:
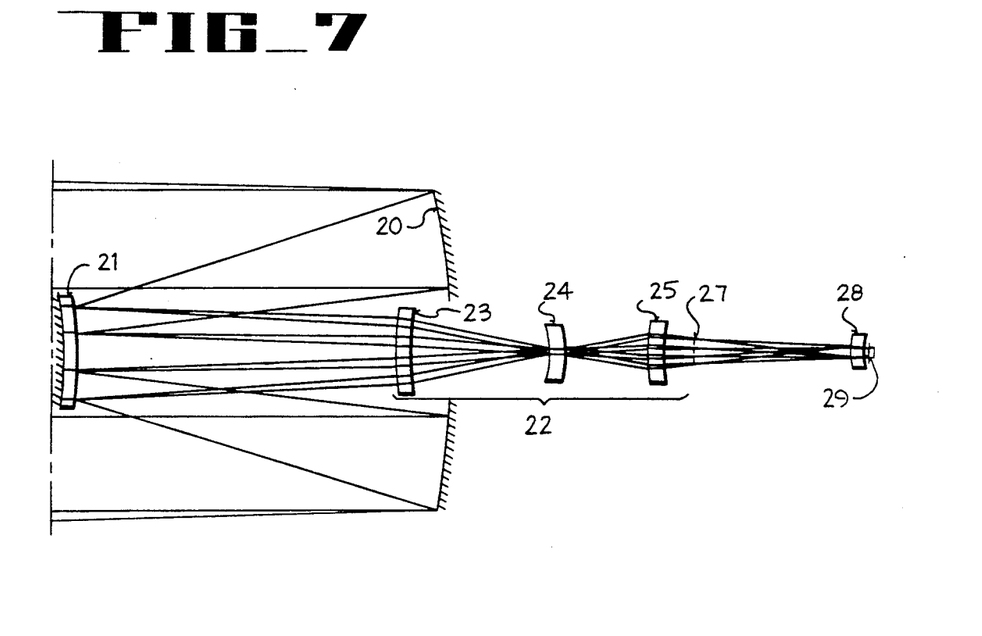
FIG. 7 is a profile illustration of the catadioptric zoom relay telescope of FIG. 1 after the movable lens elements have changed positions (i.e., zoomed) to provide a focal ratio of about f/4.5, a focal length of about 2250 mm, and a field of view of about 0.375 degree.

The same telescope as shown in FIG. 1, but with the positions of the movable lens elements 23, 24 and 25 changed in accordance with the values listed in Table V for the separations between adjacent surfaces, is illustrated in FIG. 7. The position of the Lyot stop 27 accordingly also changes, but the position of the image plane where the detector 29 is located remains unchanged. The image plane is represented as a four-quadrant square in FIG. 8, which is essentially a reprise of FIGS. 2 and 5 because the image plane does not change as the telescope zooms to achieve imagery at different focal ratios.

Figures 8, 9:
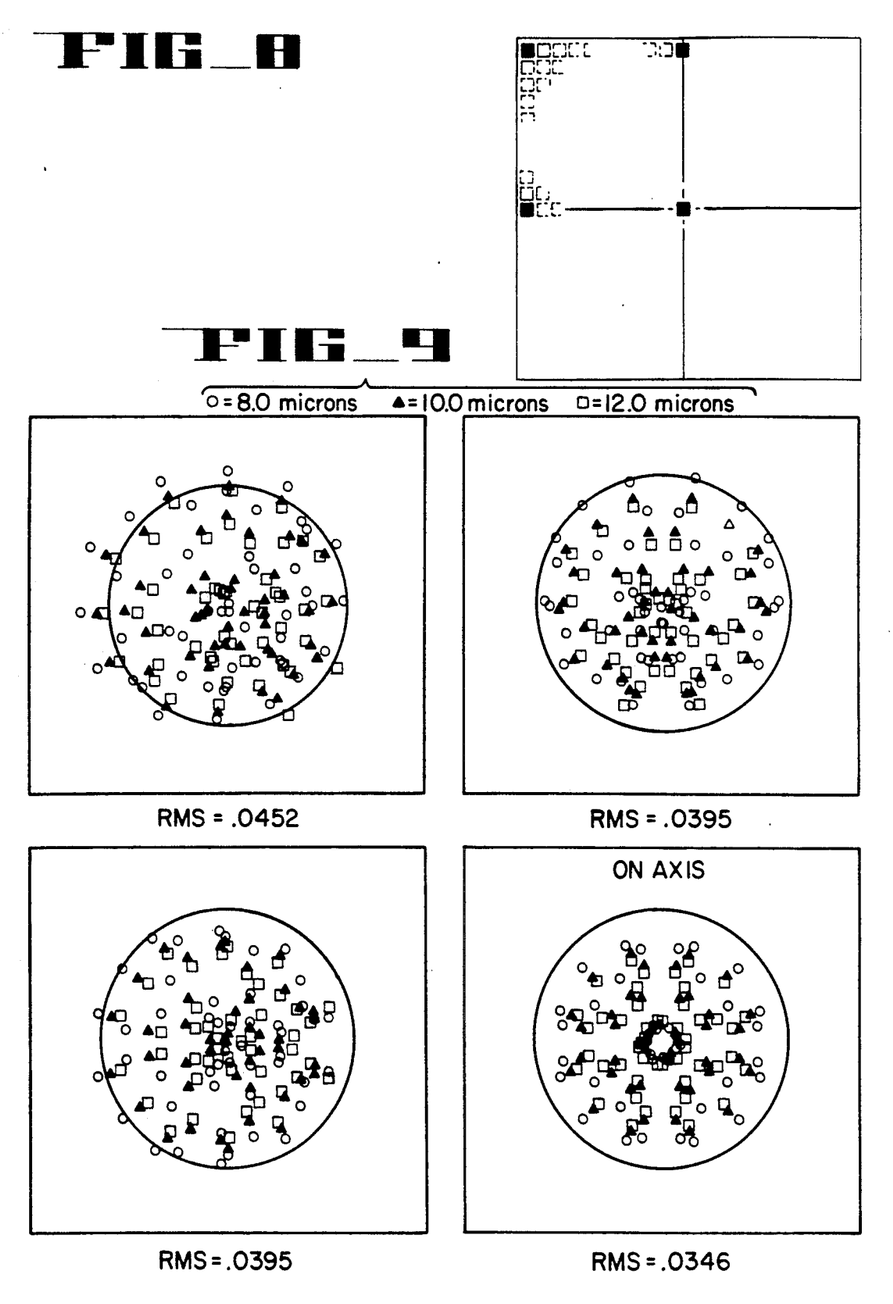
FIG. 8 is a reprise of FIGS. 2 and 5 schematically representing the image plane of the catadioptric zoom relay telescope of the present invention on which an array of pixels indicating an array of corresponding photodetecting elements is illustrated.
FIG. 9 is a set of spot diagrams showing ray intercepts for three distinct wavelengths on four different pixels, as indicated by the darkened pixels in FIG. 8, on the image plane of the catadioptric zoom relay telescope of the present invention with lens elements positioned as illustrated in FIG. 7.

In FIG. 9, performance of the telescope with the movable lens elements 23, 24 and 25 in the positions indicated in FIG. 7, and with separations between adjacent surfaces as specified in Table V, is illustrated as a function of wavelength and field of view by means of a corresponding set of spot diagrams in which ray intercepts at the image plane are shown. The three wavelengths for which ray intercepts are shown in FIG. 9 are 8.0 microns (whose ray intercepts are represented by circles), 10.0 microns (whose ray intercepts are represented by triangles), and 12.0 microns (whose ray intercepts are represented by squares). The four-quadrant square of FIG. 8 representing the image plane is dimensioned to fill a field of view of 0.33 degree, and each pixel is a square of 200 microns on an edge. The lower right-hand pixel shown in FIG. 9 is the center pixel on the image plane as shown in FIG. 8; and all ray intercepts shown thereon have an RMS spot radius of about 0.0346 micron. The upper right-hand pixel shown in FIG. 9 is the uppermost pixel on the vertical axis separating the two upper quadrants on the image plane as shown in FIG. 8; and all ray intercepts shown thereon have an RMS spot radius of about 0.0395 micron. The upper left-hand pixel shown in FIG. 9 is the pixel that is shown in FIG. 8 in the upper left-hand corner of the image plane; and all ray intercepts shown thereon have an RMS spot radius of about 0.0452 micron. The lower left-hand pixel shown in FIG. 9 is the left-most pixel on the horizontal axis separating the upper left quadrant from the lower left quadrant on the image plane as shown in FIG. 8; and all ray intercepts shown thereon have an RMS spot radius of about 0.0395 micron.

The distribution of ray intercepts in the other pixels in the upper left-hand quadrant on the image plane, as indicated in FIG. 8, can be appreciated by extrapolation from the distributions shown in the four pixels illustrated in FIG. 9. Also, the distribution of ray intercepts in the pixels in the other three quadrants of the image plane can be appreciated by noting that the distributions are symmetrical with respect to the vertical and horizontal axes defining the quadrants. In FIG. 9, an Airy disk for the 12.0 micron wavelength is shown concentrically positioned on each pixel. It is noteworthy with respect to FIG. 9 that ray intercepts in the wavelength range from 8.0 microns to 12.0 microns are clustered practically entirely within the Airy disk of 12-micron diameter over the image plane, which indicates essentially diffraction-limited performance.

To zoom still further to an imagery that can be achieved with a focal ratio of f/6.0, a focal length of about 3000 mm (more precisely, 2989.3 mm), and a field of view of about 0.250 degree (more precisely, 0.24 degree), the positions of the movable lens elements 23, 24 and 25 are changed so that the separations between adjacent surfaces are as follows:

TABLE VI

| Lens Position | Separation (mm) |
| --- | --- |
| $D_1$ | 427.412 |
| $D_2$ | 244.644 |
| $D_3$ | 79.024 |
| $D_4$ | 51.139 |
| $D_5$ | 299.777 |

Figure 10:
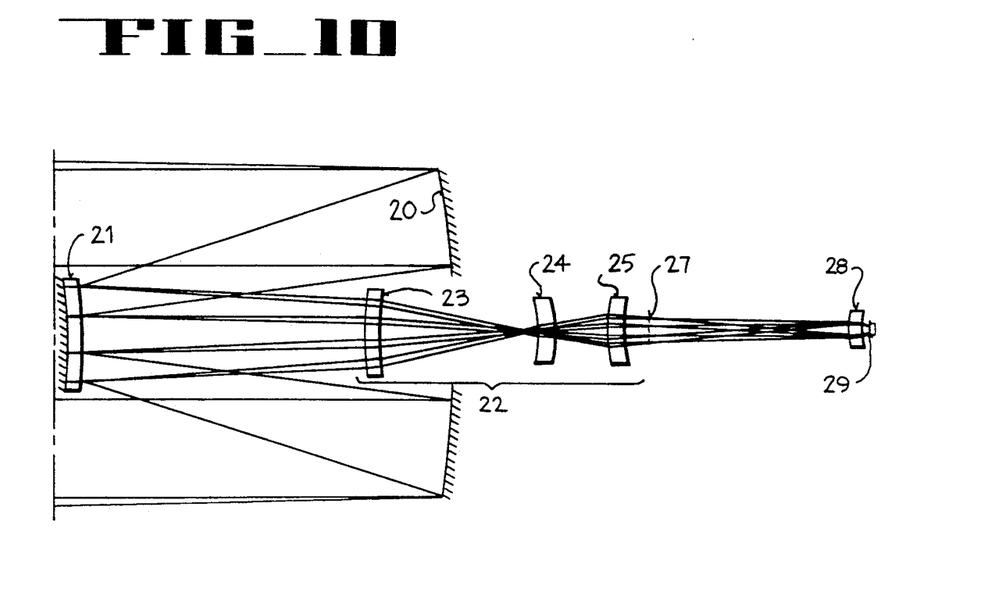
FIG. 10 is a profile illustration of the catadioptric zoom relay telescope of FIG. 1 after the movable lens elements have changed positions (i.e., zoomed) to provide a focal ratio of f/6.0, a focal length of about 3000 mm, and a field of view of about 0.250 degree.

The same telescope as shown in FIG. 1, but with the positions of the movable lens elements 23, 24 and 25 further changed in accordance with the values listed in Table VI for the separations between adjacent surfaces, is illustrated in FIG. 10. The position of the Lyot stop 27 accordingly also changes, but the position of the image plane where the detector 29 is located still remains unchanged. The image plane is again represented as a four-quadrant square in FIG. 11, which is essentially a reprise of FIGS. 2, 5 and 8, because the image plane does not change as the telescope zooms to achieve imagery at different focal ratios.

Figure 11:
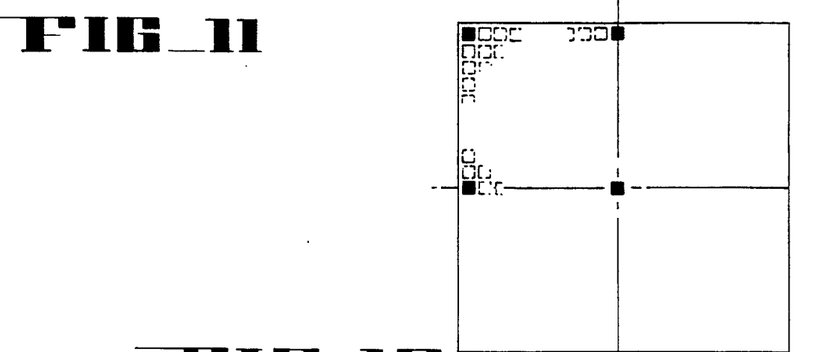
FIG. 11 is a reprise of FIGS. 2, 5 and 8 schematically representating the image plane of the catadioptric zoom relay telescope of the present invention on which an array of pixels indicating an array of corresponding photodetecting elements is illustrated.
Figure 12:
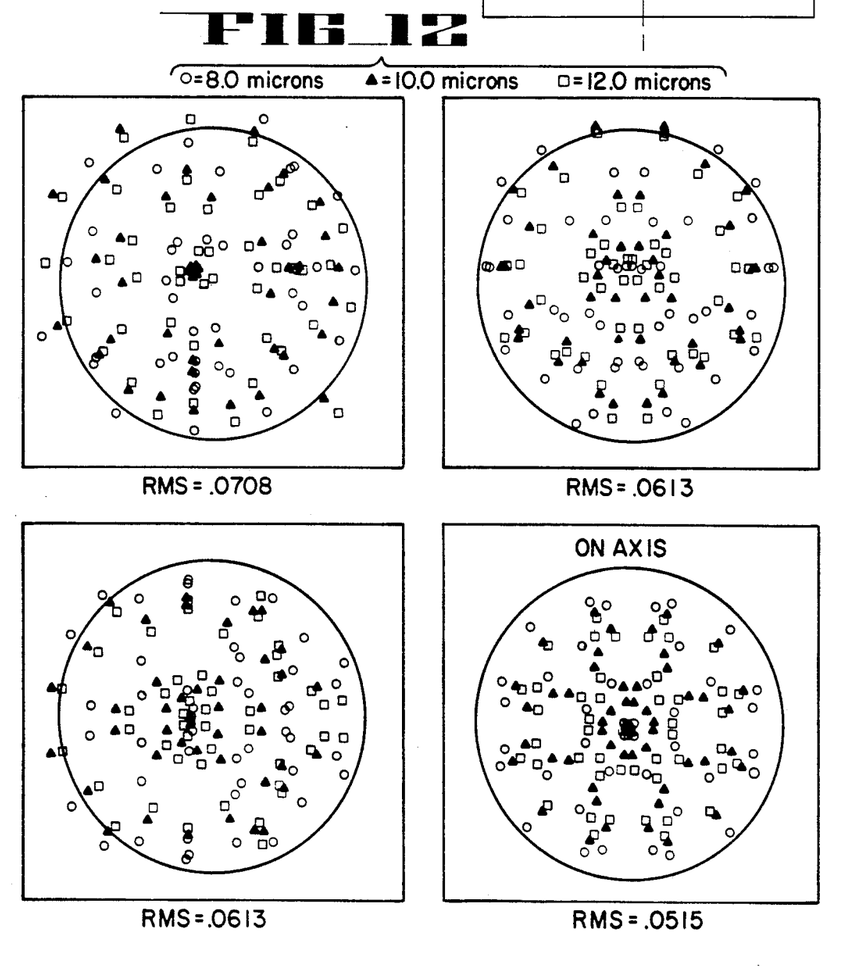
FIG. 12 is a set of spot diagrams showing ray intercepts for three distinct wavelengths on four different pixels, as indicated by the darkened pixels in FIG. 11, on the image plane of the catadioptric zoom relay telescope of the present invention with lens elements positioned as illustrated in FIG. 10.

In FIG. 12, performance of the telescope with the movable lens elements 23, 24 and 25 in the positions indicated in FIG. 10, and with separations between adjacent surfaces as specified in Table VI, is illustrated as a function of wavelength and field of view by means of a corresponding set of spot diagrams in which ray intercepts at the image plane are shown. The three wavelengths for which ray intercepts are shown in FIG. 12 are 8.0 microns (whose ray intercepts are represented by circles), 10.0 microns (whose ray intercepts are represented by triangles), and 12.0 microns (whose ray intercepts are represented by squares). The four-quadrant square of FIG. 11 representing the image plane is dimensioned to fill a field of view of 0.24 degree, and each pixel is a square of 200 microns on an edge. The lower right-hand pixel shown in FIG. 12 is the center pixel on the image plane as shown in FIG. 11; and all ray intercepts shown thereon have an RMS spot radius of about 0.0515 micron. The upper right-hand pixel shown in FIG. 12 is the uppermost pixel on the vertical axis separating the two upper quadrants on the image plane as shown in FIG. 11; and all ray intercepts shown thereon have an RMS spot radius of about 0.0613 micron. The upper left-hand pixel shown in FIG. 12 is the pixel that is shown in FIG. 11 in the upper left-hand corner of the image plane; and all ray intercepts shown thereon have an RMS spot radius of about 0.0708 micron. The lower left-hand pixel shown in FIG. 12 is the left-most pixel on the horizontal axis separating the upper left quadrant from the lower left quadrant on the image plane as shown in FIG. 11; and all ray intercepts shown thereon have an RMS spot radius of about 0.0613 micron.

The distribution of ray intercepts in the other pixels in the upper left-hand quadrant on the image plane, as indicated in FIG. 11, can be appreciated by extrapolation from the distributions shown in the four pixels illustrated in FIG. 12. Also, the distribution of ray intercepts in the pixels in the other three quadrants of the image plane can be appreciated by noting that the distributions are symmetrical with respect to the vertical and horizontal axes defining the quadrants. In FIG. 12, an Airy disk for the 12.0 micron wavelength is shown concentrically positioned on each pixel. It is noteworthy with respect to FIG. 12 that the ray intercepts in the wavelength range from 8.0 microns to 12.0 microns are clustered practically entirely within the Airy disk of 12-micron diameter over the image plane, which indicates essentially diffraction-limited performance.

Appropriate positions for the movable lens elements 23, 24 and 25 to achieve focal ratios, focal lengths and fields of view with values between those obtained when the movable lens elements 23, 24 and 25 are in the positions indicated in Tables III, IV, V and VI can be determined by extrapolation. The positions of the movable lens elements 23, 24 and 25 can be simultaneously changed by a conventional cam mechanism so as to produce a continuous zoom range from less than f/1.5 to more than f/6.0.

The present invention has been described and illustrated herein by a single embodiment. However, optical designers skilled in the art, upon perusing the foregoing description and accompanying drawing, could modify the disclosed embodiment to accommodate particular applications. Thus, for example, the optical prescription given in Table I could be re-optimized for operation at the same focal ratio of f/1.5, the same effective focal length of about 750 mm, and the same field of view of about 1.000 degree, but in the spectral bandwidth from 3 to 5 microns. It would then be a routine task to determine appropriate separations between adjacent surfaces in order to achieve imagery for different focal ratios such as, for example, f/3.0, f/4.5 and f/6.0, and for corresponding focal lengths and fields of view.

Accordingly, the foregoing description and accompanying drawing are to be considered as merely illustrative of the invention, which is defined more broadly by the following claims and their equivalents.

I claim:

1. A catadioptric zoom relay telescope capable of achieving a continuously variable focal length over a band of infrared wavelengths, said telescope comprising a primary mirror for gathering rays in said infrared wavelength band, said primary mirror being of aspheric profile, a secondary Mangin mirror for directing said rays through an aperture in said primary mirror, said primary mirror and said secondary Mangin mirror being coaxially disposed along an optic axis, said aperture in said primary mirror being substantially symmetric about said optic axis, an imaging system consisting of only three movable lens elements disposed along said optical axis to form a real image of said primary mirror at a Lyot stop, said Lyot stop being disposed along said optic axis externally of said imaging system, and field lens means disposed along said optic axis to focus rays passing through said Lyot stop onto a detector, said field lens means being fixedly positioned relative to said primary mirror and secondary Mangin mirror.

2. The telescope of claim 1 wherein said mirrors, said imaging system and said field lens means are configured and positioned in combination with each other according to a design form such that said telescope can function so as to maintain substantially diffraction-limited imagery on a substantially unvarying focal plane over said infrared wavelength band throughout a range of changes in focal ratio from less than f/1.5 to more than f/6.0.

3. The telescope of claim 1 wherein all refractive components of said telescope are all made of substantially the same optical material, said refractive components being configured so as to achieve minimal chromatic aberration over said infrared wavelength band for a plurality of different positions of said three movable lens elements of said imaging system.

4. The telescope of claim 3 wherein said refractive components of said telescope are all made of germanium.

5. The telescope of claim 2 wherein said primary mirror has an ellipsoidal reflective surface.

6. The telescope of claim 5 wherein said primary mirror has a generally circular perimeter with a diameter of about 500 mm, said design form being optimized for operation at a focal ratio of about f/1.5 with an effective focal length of about 750 mm and a field of view of about 1.000 degree in a spectral bandwidth from 8 to 12 microns.

7. The telescope of claim 2 wherein said design form is substantially in accord with an optical prescription expressed in tabular format as follows:

| Surface [No.] Order | Element Diameter (mm) | Radius of Curvature (mm) | Distance to Next Surface (mm) |
|---|---|---|---|
| 1st | 500 | −1586.750 (k = −0.564052) | −563.358 |
| 2nd | 170 | −1282.451 | −20.000 |
| 3rd |  | −949.909 | −20.000 |
| 4th |  | −1282.451 | 612.428 |
| 5th | 130 | 534.803 | 20.000 |
| 6th |  | 1151.637 | 271.869 |
| 7th | 90 | −148.547 | 24.000 |
| 8th |  | −149.590 | 107.467 |
| 9th | 90 | 176.909 | 24.000 |
| 10th |  | 454.648 | 36.433 |
| 11th |  | ∞ | 73.798 |
| 12th | 50 | 65.371 | 20.000 |
| 13th |  | 101.019 | 10.000 | where said surfaces tabulated above are the surfaces of optical elements of said telescope in consecutive order along said optic axis in the direction of propagation of said rays through said telescope, and where k=−0.564052 is the conic constant for said primary mirror.

* * * * *